(12) United States Patent
Gutta et al.

(10) Patent No.: US 7,932,953 B2
(45) Date of Patent: *Apr. 26, 2011

(54) AMBIENT LIGHT DERIVED FROM VIDEO CONTENT BY MAPPING TRANSFORMATIONS THROUGH UNRENDERED COLOR SPACE

(75) Inventors: Srinivas Gutta, Bangalore (IN); Simon J. M. Kuppens, Geldrop (NL); Huub Vanden Broek, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1329 days.

This patent is subject to a terminal disclaimer.

(21) Appl. No.: 10/585,367

(22) PCT Filed: Jan. 5, 2005

(86) PCT No.: PCT/IB2005/050053
§ 371 (c)(1),
(2), (4) Date: Jul. 5, 2006

(87) PCT Pub. No.: WO2005/069637
PCT Pub. Date: Jul. 28, 2005

(65) Prior Publication Data
US 2009/0175536 A1 Jul. 9, 2009

Related U.S. Application Data

(60) Provisional application No. 60/534,266, filed on Jan. 5, 2004.

(51) Int. Cl.
*H04N 5/58* (2006.01)
(52) U.S. Cl. ............................ 348/602; 348/832
(58) Field of Classification Search .......... 348/552–558, 348/602, 603, 655–661, 832–843; 362/1, 362/234, 253, 33
See application file for complete search history.

(56) References Cited

U.S. PATENT DOCUMENTS

| | | | | |
|---|---|---|---|---|
| 2,665,419 | A * | 1/1954 | Van Orden | 348/836 |
| 6,611,297 | B1 * | 8/2003 | Akashi et al. | 348/739 |
| 6,717,376 | B2 * | 4/2004 | Lys et al. | 315/292 |
| 7,234,814 | B2 * | 6/2007 | Morita et al. | 351/203 |

FOREIGN PATENT DOCUMENTS

JP 06076958 A * 3/1994

* cited by examiner

*Primary Examiner* — M. Lee

(57) ABSTRACT

Extracting and processing video content encoded in a rendered color space to be emulated by an ambient light source, comprising extracting color information from a video signal and transforming the color information through unrendered color space using tristprimary matrices to form a second rendered color space to drive the ambient light source. Video signal decoding into frames can allow extracting average or other color information from an selected screen regions to reduce bitstream load, and negative gamma correction helps prevent garish or inappropriate chromaticities and luminance.

20 Claims, 6 Drawing Sheets

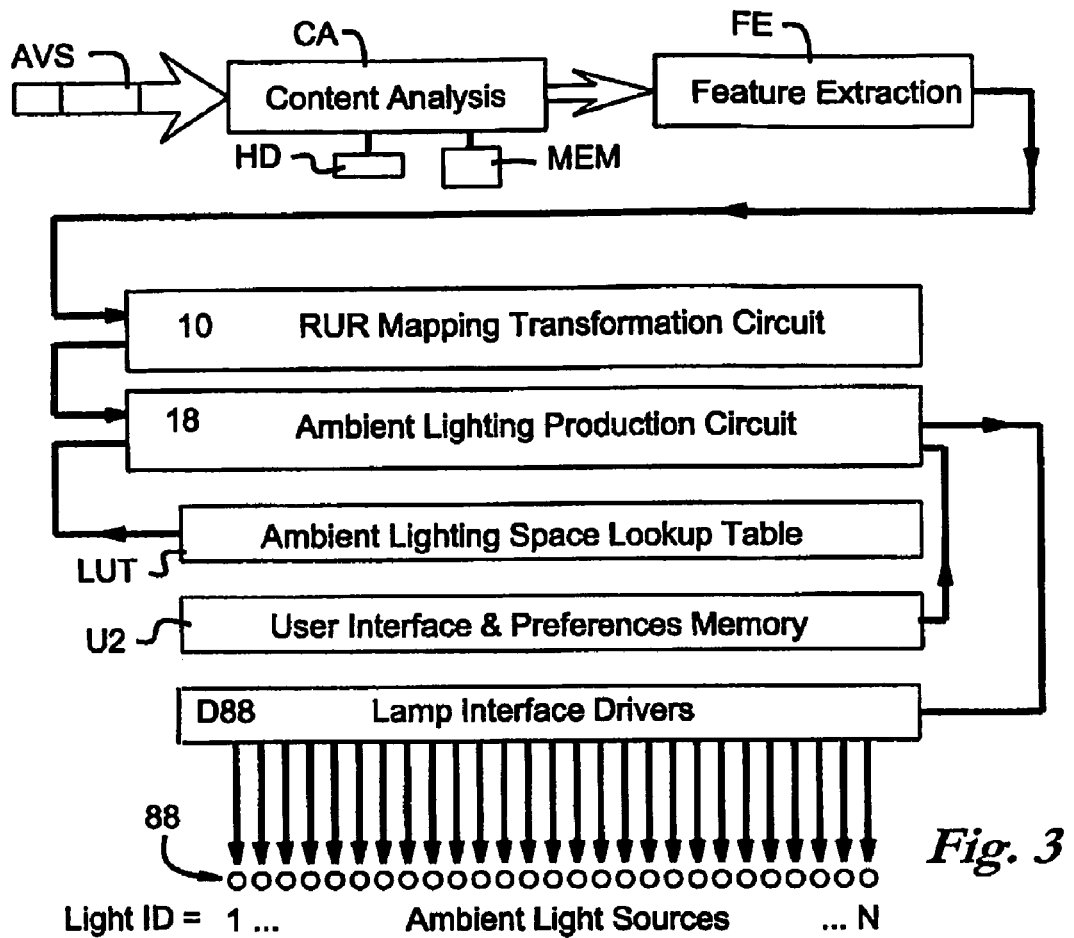

$$\begin{bmatrix} X \\ Y \\ Z \end{bmatrix} = M_1 \cdot \begin{bmatrix} R \\ G \\ B \end{bmatrix}$$

Video Display D

*Fig. 6*

$$\begin{bmatrix} X \\ Y \\ Z \end{bmatrix} = M_2 \cdot \begin{bmatrix} R' \\ G' \\ B' \end{bmatrix}$$

Ambient Light Sources 88

*Fig. 7*

$$\begin{bmatrix} R' \\ G' \\ B' \end{bmatrix} = M_2^{-1} \cdot M_1 \cdot \begin{bmatrix} R \\ G \\ B \end{bmatrix}$$

*Fig. 8*

— Prior Art —

$$M = \begin{bmatrix} s_r X_r & s_g X_g & s_b X_b \\ s_r Y_r & s_g Y_g & s_b Y_b \\ s_r Z_r & s_g Z_g & s_b Z_b \end{bmatrix}$$

*Fig. 9*

$$\begin{bmatrix} s_r \\ s_g \\ s_b \end{bmatrix} = \begin{bmatrix} X_w \\ Y_w \\ Z_w \end{bmatrix} \begin{bmatrix} X_r & X_g & X_b \\ Y_r & Y_g & Y_b \\ Z_r & Z_g & Z_b \end{bmatrix}^{-1}$$

— Prior Art — *Fig. 10*

$$\begin{bmatrix} s_r \\ s_g \\ s_b \end{bmatrix} \begin{bmatrix} X_r & X_g & X_b \\ Y_r & Y_g & Y_b \\ Z_r & Z_g & Z_b \end{bmatrix} = \begin{bmatrix} X_w \\ Y_w \\ Z_w \end{bmatrix}$$

— Prior Art — *Fig. 11*

AMBIENT LIGHT DERIVED FROM VIDEO CONTENT BY MAPPING TRANSFORMATIONS THROUGH UNRENDERED COLOR SPACE

CROSS REFERENCE TO RELATED APPLICATION

This application claims the benefit of U.S. provisional application Ser. No. 60/534,266 filed Jan. 5, 2004, which is incorporated herein in whole by reference.

This invention relates to production and setting of ambient lighting effects using multiple light sources, and typically based on, or associated with, video content, such as from a video display. More particularly, it relates to a method to drive or set multiple ambient light sources by extracting selected color information from video in real time, and performing color mapping transformations from the video environment to that which allows driving a plurality of ambient light sources.

Engineers have long sought to broaden the sensory experience obtained consuming video content, such as by enlarging viewing screens and projection areas, modulating sound for realistic 3-dimensional effects, and enhancing video images, including broader video color gamuts, resolution, and picture aspect ratios, such as with high definition (HD) digital TV television and video systems. Moreover, film, TV, and video producers also try to influence the experience of the viewer using visual and auditory means, such as by clever use of color, scene cuts, viewing angles, peripheral scenery, and computer-assisted graphical representations. This would include theatrical stage lighting as well. Lighting effects, for example, are usually scripted—synchronized with video or play scenes—and reproduced with the aid of a machine or computer programmed with the appropriate scene scripts encoded with the desired schemes.

In the prior art digital domain, automatic adaptation of lighting to fast changes in a scene, including unplanned or unscripted scenes, has not been easy to orchestrate in large part because of the overhead of large high bandwidth bit streams required using present systems.

Philips (Netherlands) and other companies have disclosed means for changing ambient or peripheral lighting to enhance video content for typical home or business applications, using separate light sources far from the video display, and for many applications, some sort of advance scripting or encoding of the desired lighting effects. Ambient lighting added to a video display or television has been shown to reduce viewer fatigue and improve realism and depth of experience.

Sensory experiences are naturally a function of aspects of human vision, which uses an enormously complex sensory and neural apparatus to produce sensations of color and light effects. Humans can distinguish perhaps 10 million distinct colors. In the human eye, for color-receiving or photopic vision, there are three sets of approximately 2 million sensory bodies called cones which have absorption distributions which peak at 445, 535, and 565 nm light wavelengths, with a great deal of overlap. These three cone types form what is called a tristimulus system and are called B (blue), G (green), and R (red) for historical reasons; the peaks do not necessarily correspond with those of any primary colors used in a display, e.g., commonly used RGB phosphors. There is also interaction for scotopic, or so-called night vision bodies called rods. The human eye typically has 120 million rods, which influence video experiences, especially for low light conditions such as found in a home theatre.

Color video is founded upon the principles of human vision, and well known trichromatic and opponent channel theories of human vision have been incorporated into our understanding of how to influence the eye to see desired colors and effects which have high fidelity to an original or intended image. In most color models and spaces, three dimensions or coordinates are used to describe human visual experience.

Color video relies absolutely on metamerism, which allows production of color perception using a small number of reference stimuli, rather than actual light of the desired color and character. In this way, a whole gamut of colors is reproduced in the human mind using a limited number of reference stimuli, such as well known RGB (red, green, blue) tristimulus systems used in video reproduction worldwide. It is well known, for example, that nearly all video displays show yellow scene light by producing approximately equal amounts of red and green light in each pixel or picture element. The pixels are small in relation to the solid angle they subtend, and the eye is fooled into perceiving yellow; it does not perceive the green or red that is actually being broadcast.

There exist many color models and ways of specifying colors, including well known CIE (Commission Internationale de l'Eclairage) color coordinate systems in use to describe and specify color for video reproduction. Any number of color models can be employed using the instant invention, including application to unrendered opponent color spaces, such as the CIE L*U*V* (CIELUV) or CIE L*a*b* (CIELAB) systems. The CIE established in 1931 a foundation for all color management and reproduction, and the result is a chromaticity diagram which uses three coordinates, x, y, and z. A plot of this three dimensional system at maximum luminosity is universally used to describe color in terms of x and y, and this plot, called the 1931 x,y chromaticity diagram, is believed to be able to describe all perceived color in humans. This is in contrast to color reproduction, where metamerism is used to fool the eye and brain. Many color models or spaces are in use today for reproducing color by using three primary colors or phosphors, among them Adobe RGB, NTSC RGB, etc.

It is important to note, however, that the range of all possible colors exhibited by video systems using these tristimulus systems is limited. The NTSC (National Television Standards Committee) RGB system has a relatively wide range of colors available, but this system can only reproduce half of all colors perceivable by humans. Many blues and violets, blue-greens, and oranges/reds are not rendered adequately using the available scope of traditional video systems.

Furthermore, the human visual system is endowed with qualities of compensation and discernment whose understanding is necessary to design any video system. Color in humans can occur in several modes of appearance, among them, object mode and illuminant mode.

In object mode, the light stimulus is perceived as light reflected from an object illuminated by a light source. In illuminant mode, the light stimulus is seen as a source of light. Illuminant mode includes stimuli in a complex field that are much brighter than other stimuli. It does not include stimuli known to be light sources, such as video displays, whose brightness or luminance is at or below the overall brightness of the scene or field of view so that the stimuli appear to be in object mode.

Remarkably, there are many colors which appear only in object mode, among them, brown, olive, maroon, grey, and beige flesh tone. There is no such thing, for example, as a brown illuminant source of light, such as a brown-colored traffic light.

For this reason, ambient lighting supplements to video systems which attempt to add object colors cannot do so using direct sources of bright light. No combination of bright red and green sources of light at close range can reproduce brown or maroon, and this limits choices considerably. Only spectral colors of the rainbow, in varying intensities and saturation, can be reproduced by direct observation of bright sources of light. This underscores the need for fine control over ambient lighting systems, such as to provide low intensity luminance output from light sources with particular attention to hue management. This fine control is not presently addressed in a way that permits fast-changing and subtle ambient lighting under present data architectures.

Video reproduction can take many forms. Spectral color reproduction allows exact reproduction of the spectral power distributions of the original stimuli, but this is not realizable in any video reproduction that uses three primaries. Exact color reproduction can replicate human visual tristimulus values, creating a metameric match to the original, but overall viewing conditions for the picture and the original scene must be similar to obtain a similar appearance. Overall conditions for the picture and original scene include the angular subtense of the picture, the luminance and chromaticity of the surround, and glare. One reason that exact color reproduction often cannot be achieved is because of limitations on the maximum luminance that can be produced on a color monitor.

Colorimetric color reproduction provides a useful alternative where tristimulus values are proportional to those in the original scene. Chromaticity coordinates are reproduced exactly, but with proportionally reduced luminances. Colorimetric color reproduction is a good reference standard for video systems, assuming that the original and the reproduced reference whites have the same chromaticity, the viewing conditions are the same, and the system has an overall gamma of unity. Equivalent color reproduction, where chromaticity and luminances match the original scene cannot be achieved because of the limited luminance generated in video displays.

Most video reproduction in practice attempts to achieve corresponding color reproduction, where colors reproduced have the same appearance that colors in the original would have had if they had been illuminated to produce the same average luminance level and the same reference white chromaticity as that of the reproduction. Many, however, argue that the ultimate aim for display systems is in practice preferred color reproduction, where preferences of the viewer influence color fidelity. For example, suntanned skin color is preferred to average real skin color, and sky is preferred bluer and foliage greener than they really are. Even if corresponding color reproduction is accepted as a design standard, some colors are more important than others, such as flesh tones, the subject of special treatment in many reproduction systems such as the NTSC video standard.

In reproducing scene light, chromatic adaptation to achieve white balance is important. With properly adjusted cameras and displays, whites and neutral grays are typically reproduced with the chromaticity of CIE standard daylight illuminant D65. By always reproducing a white surface with the same chromaticity, the system is mimicking the human visual system, which inherently adapts perceptions so that white surfaces always appear the same, whatever the chromaticity of the illuminant, so that a white piece of paper will appear white, whether it is found in a bright sunlight day at the beach, or a incandescent-lit indoor scene. In color reproduction, white balance adjustment usually is made by gain controls on the R, G, and B channels.

The light output of a typical color receiver is typically not linear, but rather follows a power-law relationship to applied video voltages. The light output is proportional to the video-driving voltage raised to the power gamma, where gamma is typically 2.5 for a color CRT (cathode ray tube), and 1.8 for other types of light sources. Compensation for this factor is made via three primary gamma correctors in camera video processing amplifiers, so that the primary video signals that are encoded, transmitted and decoded are in fact not R, G, and B, but $R^{1/\gamma}$, $G^{1/\gamma}$, and $B^{1/\gamma}$. Colorimetric color reproduction requires that the overall gamma for video reproduction—including camera, display, and any gamma-adjusting electronics be unity, but when corresponding color reproduction is attempted, the luminance of the surround take precedence. For example, a dim surround requires a gamma of about 1.2, and a dark surround requires a gamma of about 1.5 for optimum color reproduction. Gamma is an important implementation issue for RGB color spaces.

Most color reproduction encoding uses standard RGB color spaces, such as sRGB, ROMM RGB, Adobe RGB 98, Apple RGB, and video RGB spaces such as that used in the NTSC standard. Typically, an image is captured into a sensor or source device space, which is device and image specific. It may be transformed into an unrendered image space, which is a standard color space describing the original's colorimetry (see Definitions section).

However, video images are nearly always directly transformed from a source device space into a rendered image space (see Definitions section), which describes the color space of some real or virtual output device such as a video display. Most existing standard RGB color spaces are rendered image spaces. For example, source and output spaces created by cameras and scanners are not CIE-based color spaces, but spectral spaces defined by spectral sensitivities and other characteristics of the camera or scanner.

Rendered image spaces are device-specific color spaces based on the colorimetry of real or virtual device characteristics. Images can be transformed into rendered spaces from either rendered or unrendered image spaces. The complexity of these transforms varies, and can include complicated image dependent algorithms. The transforms can be non-reversible, with some information of the original scene encoding discarded or compressed to fit the dynamic range and gamut of a specific device.

There is currently only one unrendered RGB color space that is in the process of becoming a standard, ISO RGB defined in ISO 17321, most often used for color characterization of digital still cameras. In most applications today, images are converted into a rendered color space for either archiving and data transfer, including video signals. Converting from one rendered image or color space to another can cause severe image artifacts. The more mismatched the gamuts and white points are between two devices, the stronger the negative effects.

One problem in prior art ambient light display systems is that no specific method is given to provide for synchronous real time operation to transform rendered tristimulus values from video to that of ambient light sources to give proper colorimetry and appearance. For example, output from LED ambient light sources is often garish, with limited or skewed color gamuts, and hue and chroma are difficult to assess and reproduce. For example, U.S. Pat. No. 6,611,297 to Akashi et al. deals with realism in ambient lighting, but no specific method is given to insure correct and pleasing chromaticity, and the teaching of Akashi '297 does not allow for analyzing video in real time, but rather needs a script or the equivalent.

In addition, setting of ambient light sources using gamma corrected color spaces from video content often result in garish, bright colors. A more serious problem in the prior art is the large amount of transmitted information that is needed to drive ambient light sources as a function of real time video content, and to suit a desired fast-changing ambient light environment where good color matching is desired.

It is therefore advantageous to expand the possible gamut of colors produced by ambient lighting in conjunction with a typical tristimulus video display system. It is also desired to exploit characteristics of the human eye, such as changes in relative luminosity of different colors as a function of light levels, by modulating or changing color and light character delivered to the video user using an ambient lighting system that uses to good advantage compensating effects, sensitivities, and other peculiarities of human vision.

It is also advantageous to create a quality ambient atmosphere free from the effects of gamma-induced distortion. It is further desired to be able to provide a method for providing emulative ambient lighting drawn from selected video regions using an economical data stream that encodes average or characterized color values.

Information about video and television engineering, compression technologies, data transfer and encoding, human vision, color science and perception, color spaces, colorimetry and image rendering, including video reproduction, can be found in the following references which are hereby incorporated into this disclosure in their entirety: ref[1] Color Perception, Alan R. Robertson, Physics Today, December 1992, Vol 45, No 12, pp. 24-29; ref[2] The Physics and Chemistry of Color, 2ed, Kurt Nassau, John Wiley & Sons, Inc., New York © 2001; ref[3] Principles of Color Technology, 3ed, Roy S. Berns, John Wiley & Sons, Inc., New York, © 2000; ref[4] Standard Handbook of Video and Television Engineering, 4ed, Jerry Whitaker and K. Blair Benson, McGraw-Hill, New York © 2003.

The invention relates to a method for extracting and processing video content encoded in a rendered color space to be emulated by an ambient light source, comprising [1] Extracting color information from a video signal that encodes at least some of the video content in the rendered color space; [2] Transforming the color information to an unrendered color space; [3] Transforming the color information from the unrendered color space to a second rendered color space so formed as to allow driving the ambient light source.

Step [1] can additionally comprise decoding the video signal into a set of frames; extracting an average color from the color information, including at least one extraction of the color information from an extraction region; using the extraction of the color information to broadcast ambient light from the ambient light source adjacent the extraction region. In addition, one can perform a gamma correction to the second rendered color space fed to the ambient light units.

Steps [2] and [3] can additionally comprise matrix transformations of primaries of the rendered color space and second rendered color space to the unrendered color space using first and second tristimulus primary matrices; and deriving a transformation of the color information into the second rendered color space by matrix multiplication of the primaries of the rendered color space, the first tristimulus matrix, and the inverse of the second tristimulus matrix.

The unrendered color space can be one of CIE XYZ; ISO RGB defined in ISO Standard 17321; Photo YCC; and CIE LAB, and steps [1], [2], and [3] can be substantially synchronous with the video signal, with ambient light broadcast from or around the video display using the color information in the second rendered color space.

Another method is disclosed for extracting and processing border region video content from a rendered color space to be emulated by an ambient light source, comprising:

[1] Extracting color information from a video signal that encodes at least some of the video content in the rendered color space, after decoding the video signal into individual frames;

[2] Extracting an average color from the color information from an extraction region in each of the individual frames; [3] Transforming the average color to an unrendered color space; [4] Transforming the average color from the unrendered color space to a second rendered color space so formed as to allow driving the ambient light source; and [5] using the average color to broadcast ambient light from the ambient light source adjacent the extraction region. Steps [1], [2], [3], [4], and [5] can be substantially synchronous with the video signal.

In addition, a method is disclosed for extracting and processing border region video content from a rendered color space to be emulated by an ambient light source, using a colorimetric estimate, comprising: [1] Extracting color information from a video signal that encodes at least some of the video content in the rendered color space, after decoding the video signal into individual frames; [2] Extracting a colorimetric estimate from the color information from an extraction region in each of the individual frames; [3] Transforming the colorimetric estimate to an unrendered color space; [4] Transforming the calorimetric estimate from the unrendered color space to a second rendered color space so formed as to allow driving the ambient light source; and [5] using the colorimetric estimate to broadcast ambient light (L4) from the ambient light source adjacent the extraction region.

FIG. 3 shows a system according to the invention to extract color information and effect color space transformations to allow driving an ambient light source;

FIG. 4 shows an equation for calculating average color information from a video extraction region;

FIG. 5 shows a prior art matrix equation to transform rendered primaries RGB into unrendered color space XYZ;

FIGS. 6 and 7 show matrix equations for mapping video and ambient lighting rendered color spaces, respectively, into unrendered color space;

FIG. 8 shows a solution using known matrix inversion to derive ambient light tristimulus values R'G'B' from unrendered color space XYZ;

FIGS. 9-11 show prior art derivation of tristimulus primary matrix M using a white point method;

Figure 1:
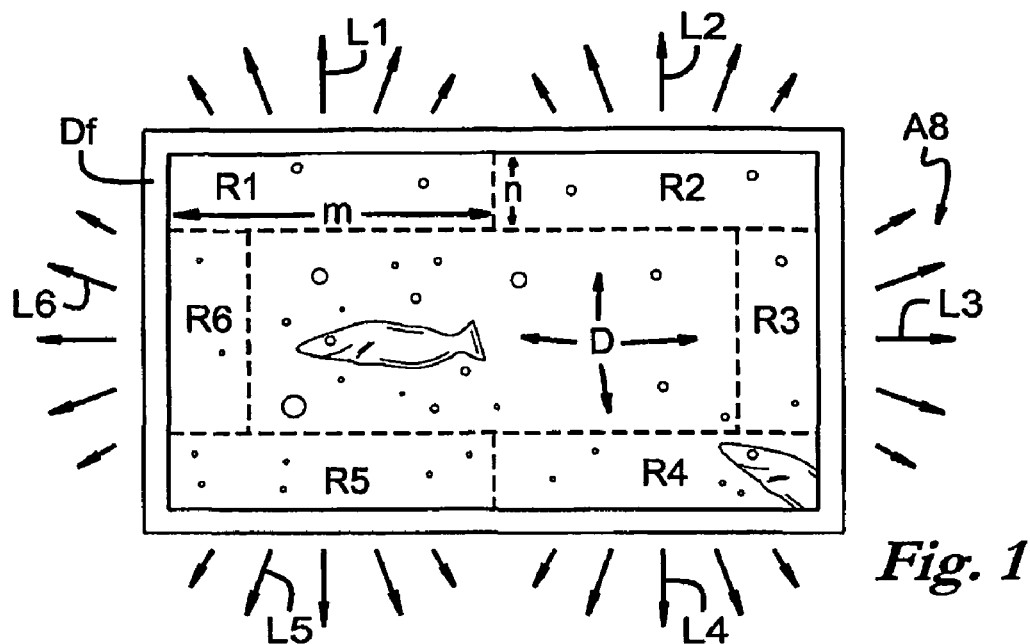
FIG. 1 shows a simple front surface view of a video display showing color information extraction regions and associated broadcasting of ambient light from six ambient light sources according to the invention.

The following definitions shall be used throughout:

Ambient light source—shall, in the appended claims, include any lighting production circuits or drivers needed to decode a light script code for use thereby.

Ambient space—shall connote any and all material bodies or air or space external to a video display unit.

Average color—shall, in the appended claims, include average characterizations other than numerical averages, and shall include functional or operator-defined characterizations of video content, including offsets of chromaticities and luminances.

Chrominance—shall, in the context of driving an ambient light source, denote a mechanical, numerical, or physical way of specifying the color character of light produced, and shall not imply a particular methodology, such as that used in NTSC or PAL television broadcasting.

Color information—shall include either or both of chrominance and luminance, or functionally equivalent quantities.

Computer—shall include not only all processors, such as CPU's (Central Processing Units) that employ known architectures, but also any intelligent device that can allow coding, decoding, reading, processing, execution of setting codes or change codes, such as digital optical devices, or analog electrical circuits that perform the same functions.

Controlled operating parameter—shall denote a parameter encoded as a representation of a physical quantity or physical variable, such as a luminance, a chrominance, or a light character index such as a delivery angle or a goniophotometric index.

Goniochromatic—shall refer to the quality of giving different color or chromaticity as a function of viewing angle or angle of observation, such as produced by iridescence.

Goniophotometric—shall refer to the quality of giving different light intensity, transmission and/or color as a function of viewing angle or angle of observation, such as found in pearlescent, sparkling or retroreflective phenomena.

Interpolate—shall include linear or mathematical interpolation between two sets of values, as well as functional prescriptions for setting values between two known sets of values . . . .

Light character—shall mean, in the broad sense, any specification of the nature of light such as produced by an ambient light source, including all descriptors other than luminance and chrominance, such as the degree of light transmission or reflection; or any specification of goniophotometric qualities, including the degree to which colors, sparkles, or other known phenomena are produced as a function of viewing angles when observing an ambient light source; a light output direction, including directionality as afforded by specifying a Poynting or other propagation vector; or specification of angular distribution of light, such as solid angles or solid angle distribution functions. It can also include a coordinate or coordinates to specify locations on an ambient light source, such as element pixels or lamp locations.

Luminance—shall denote any parameter or measure of brightness, intensity, or equivalent measure, and shall not imply a particular method of light generation or measurement, or psycho-biological interpretation.

Rendered color space—shall denote an image or color space captured from a sensor, or specific to a source or display device, which is device and image-specific. Most RGB color spaces are rendered image spaces, including the video spaces used to drive video display D. In the appended claims, both the color spaces specific to the video display and the ambient light source 88 are rendered color spaces.

Transforming color information to an unrendered color space—in the appended claims shall comprise either direct transformation to the unrendered color space, or use or benefit derived from using inversion of a tristimulus primary matrix obtained by transforming to the unrendered color space (e.g., $(M_2)^{-1}$ as shown in FIG. 8).

Unrendered color space—shall denote a standard or non-device-specific color space, such as those describing original image colorimetry using standard CIE XYZ; ISO RGB, such as defined in ISO 17321 standards; Photo YCC; and the CIE LAB color space.

Video—shall denote any visual or light producing device, whether an active device requiring energy for light production, or any transmissive medium which conveys image information, such as a window in an office building, or an optical guide where image information is derived remotely.

Video signal—shall denote the signal or information delivered for controlling a video display unit, including any audio portion thereof. It is therefore contemplated that video content analysis includes possible audio content analysis for the audio portion. Generally, a video signal can comprise any type of signal, such as radio frequency signals using any number of known modulation techniques; electrical signals, including analog and quantized analog waveforms; digital (electrical) signals, such as those using pulse-width modulation, pulse-number modulation, pulse-position modulation, PCM (pulse code modulation) and pulse amplitude modulation; or other signals such as acoustic signals, audio signals, and optical signals, all of which can use digital techniques. Data that is merely sequentially placed among or with other information, such as in computer-based applications, can be used as well.

Ambient light derived from video content according to the invention is formed to allow, if desired, a high degree of fidelity to the chromaticity of original video scene light, while maintaining a high degree of specificity of degrees of freedom for ambient lighting with a low required computational burden. This allows ambient light sources with small color gamuts and reduced luminance spaces to emulate video scene light from more advanced light sources with relatively large colors gamuts and luminance response curves. Possible light sources for ambient lighting can include any number of known lighting devices, including LEDs (Light Emitting Diodes) and related semiconductor radiators; electroluminescent devices including non-semiconductor types; incandescent lamps, including modified types using halogens or advanced chemistries; ion discharge lamps, including fluorescent and neon lamps; lasers; light sources that are modulated, such as by use of LCDs (liquid crystal displays) or other light modulators; photoluminescent emitters, or any number of known controllable light sources, including arrays that functionally resemble displays.

Now referring to FIG. 1, a simple front surface view of a video display D according to the invention is shown illustratively. Display D can be any of a number of known devices which decode video content from a rendered color space, such as an NTSC, PAL or SECAM broadcast standard, or an rendered RGB space, such as Adobe RGB. Display D comprises color information extraction regions R1, R2, R3, R4, R5, and R6 whose borders are arbitrarily pre-defined and which are to be characterized for the purpose of producing characteristic ambient light A8, such as via back-mounted controllable ambient lighting units (not shown) which produce and broadcast ambient light L1, L2, L3, L4, L5, and L6 as shown, such as by partial light spillage to a wall (not shown) on which display D is mounted. Alternatively, a display frame Df as shown can itself also comprise ambient lighting units which display light in a similar manner, including outward toward a viewer (not shown). If desired, each color information extraction region R1-R6 can influence ambient light adjacent itself. For example, color information extraction region R4 can influence ambient light L4 as shown.

Figure 2:
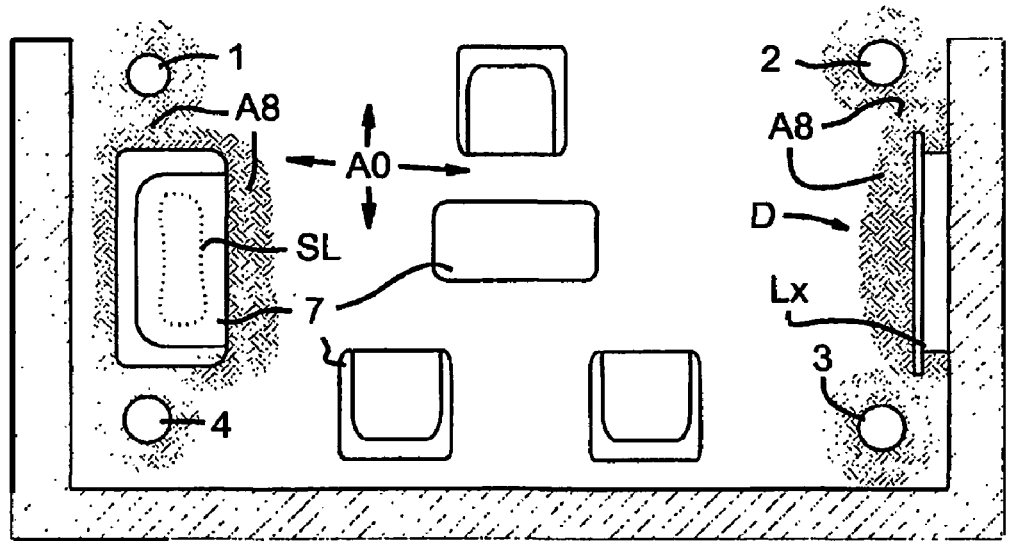
FIG. 2 shows a downward view—part schematic and part cross-sectional—of a room in which ambient light from multiple ambient light sources is produced using the invention.

Now referring to FIG. 2, a downward view—part schematic and part cross-sectional—is shown of a room or ambient space AO in which ambient light from multiple ambient light sources is produced using the invention. In ambient space AO is arranged seating and tables 7 as shown which are arrayed to allow viewing of video display D. In ambient space AO are also arrayed a plurality of ambient light units which are optionally controlled using the instant invention, including light speakers 1-4 as shown, a sublight SL under a sofa or seat as shown, as well as a set of special emulative ambient light units arrayed about display D, namely center lights that produce ambient light Lx like that shown in FIG. 1. Each of these ambient light units can emit ambient light A8, shown as shading in the figure.

In cooperation with the instant invention, one can produce ambient light from these ambient light units with colors or chromaticities derived from, but not actually broadcast by video display D. This allows exploiting characteristics of the human eye and visual system. It should be noted that the luminosity function of the human visual system, which gives detection sensitivity for various visible wavelengths, changes as a function of light levels.

For example, scotopic or night vision relying on rods tends to be more sensitive to blues and greens. Photopic vision using cones is better suited to detect longer wavelength light such as reds and yellows. In a darkened home theatre environment, such changes in relative luminosity of different colors as a function of light level can be counteracted somewhat by modulating or changing color delivered to the video user in ambient space. This can be done by subtracting light from ambient light units such as light speakers 1-4 using a light modulator (not shown) or by use of an added component in the light speakers, namely a photoluminescent emitter to further modify light before ambient release. The photoluminescent emitter performs a color transformation by absorbing or undergoing excitation from incoming light from light source and then re-emitting that light in higher desired wavelengths. This excitation and re-emission by a photoluminescent emitter, such as a fluorescent pigment, can allow rendering of new colors not originally present in the original video image or light source, and perhaps also not in the range of colors or color gamut inherent to the operation of the display D. This can be helpful for when the desired luminance of ambient light Lx is low, such as during very dark scenes, and the desired level of perception is higher than that normally achieved without light modification.

The production of new colors can provide new and interesting visual effects. The illustrative example can be the production of orange light, such as what is termed hunter's orange, for which available fluorescent pigments are well known (see ref[2]). The example given involves a fluorescent color, as opposed to the general phenomenon of fluorescence and related phenomena. Using a fluorescent orange or other fluorescent dye species can be particularly useful for low light conditions, where a boost in reds and oranges can counteract the decreased sensitivity of scotopic vision for long wavelengths.

Fluorescent dyes that can be used in ambient light units can include known dyes in dye classes such as Perylenes, Naphthalimides, Coumarins, Thioxanthenes, Anthraquinones, Thioindigoids, and proprietary dye classes such as those manufactured by the Day-Glo Color Corporation, Cleveland, Ohio, USA. Colors available include Apache Yellow, Tigris Yellow, Savannah Yellow, Pocono Yellow, Mohawk Yellow, Potomac Yellow, Marigold Orange, Ottawa Red, Volga Red, Salmon Pink, and Columbia Blue. These dye classes can be incorporated into resins, such as PS, PET, and ABS using known processes.

Fluorescent dyes and materials have enhanced visual effects because they can be engineered to be considerably brighter than nonfluorescent materials of the same chromaticity. So-called durability problems of traditional organic pigments used to generate fluorescent colors have largely been solved in the last two decades, as technological advances have resulted in the development of durable fluorescent pigments that maintain their vivid coloration for 7-10 years under exposure to the sun. These pigments are therefore almost indestructible in a home theatre environment where UV ray entry is minimal.

Alternatively, fluorescent photopigments can be used, and they work simply by absorbing short wavelength light, and re-emitting this light as a longer wavelength such as red or orange. Technologically advanced inorganic pigments are now readily available that undergo excitation using visible light, such as blues and violets, e.g., 400-440 nm light.

Goniophotometric and goniochromatic effects can similarly be deployed to produce different light colors, intensity, and character as a function of viewing angles. To realize this effect, ambient light units 1-4 and SL and Lx can use known goniophotometric elements (not shown), alone, or in combination, such as metallic and pearlescent transmissive colorants; iridescent materials using well-known diffractive or thin-film interference effects, e.g., using fish scale essence; thin flakes of guanine; or 2-aminohypoxanthine with preservative. Diffusers using finely ground mica or other substances can be used, such as pearlescent materials made from oxide layers, bornite or peacock ore; metal flakes, glass flakes, or plastic flakes; particulate matter; oil; ground glass, and ground plastics.

Now referring FIG. 3, a system according to the invention to extract color information and effect color space transformations to allow driving an ambient light source is shown. As a first step, color information is extracted from a video signal AVS using known techniques.

Video signal AVS can comprise known digital data frames or packets like those used for MPEG encoding, audio PCM encoding, etc. One can use known encoding schemes for data packets such as program streams with variable length data packets, or transport streams which divide data packets evenly, or other schemes such single program transport streams. Alternately, the functional steps or blocks given in this disclosure can be emulated using computer code and other communications standards, including asynchronous protocols.

As a general example, the video signal AVS as shown can undergo video content analysis CA as shown, using known methods to record and transfer selected content to and from a hard disk HD as shown, possibly using a library of content types or other information stored in a memory MEM as shown. This can allow independent, parallel, direct, delayed, continuous, periodic, or aperiodic transfer of selected video content. From this video content one can perform feature extraction FE as shown, such as deriving color information. This color information is still encoded in a rendered color space, and is then transformed to an unrendered color space, such as CIE XYZ using a RUR Mapping Transformation Circuit 10 as shown. RUR herein stands for the desired transformation type, namely, rendered-unrendered-rendered, and thus RUR Mapping Transformation Circuit 10 also further transforms the color information to a second rendered color space so formed as to allow driving said ambient light source or sources 88 as shown.

RUR Mapping Transformation Circuit 10 can be functionally contained in a computer system which uses software to perform the same functions, but in the case of decoding packetized information sent by a data transmission protocol, there could be memory (not shown) in the circuit 10 which contains, or is updated to contain, information that correlates to or provides video rendered color space coefficients and the like. This newly created second rendered color space is appropriate and desired to drive ambient light source 88 (such as shown in FIGS. 1 and 2), and is fed using known encoding to ambient lighting production circuit 18 as shown. Ambient lighting production circuit 18 takes the second rendered color space information from RUR Mapping Transformation Circuit 10 and then accounts for any input from any user interface and any resultant preferences memory (shown together as U2) to develop actual ambient light output control parameters (such as applied voltages) after possibly consulting an ambient lighting (second rendered) color space lookup table LUT as shown. The ambient light output control parameters generated by ambient lighting production circuit 18 are fed as shown to lamp interface drivers D88 to directly control or feed ambient light source 88 as shown, which can comprise individual ambient light units 1-N, such as previously cited ambient light speakers 1-4 or ambient center lights Lx as shown in FIGS. 1 and 2.

To reduce the computational burden, the color information removed from video signal AVS can be abbreviated or limited. Now referring to FIG. 4, an equation for calculating average color information from a video extraction region is shown. It is contemplated, as mentioned below (see FIG. 14), that the video content in video signal AVS will comprise a series of time sequenced video frames, but this is not required. For each video frame or equivalent temporal block, one can extract average or other color information from each extraction region (e.g., R4). Each extraction region can be set to have a certain size, such as 100 by 376 pixels. Assuming, for example, a frame rate of 25 frame/sec, the resultant gross data for extraction regions R1-R6 before extracting an average (assuming only one byte needed to specify 8 bit color) would be 6×100×376×25 or 5.64 million bytes/sec for each video RGB tristimulus primary. This data stream is very large and would be difficult to handle at RUR Mapping Transformation Circuit 10, so extraction of an average color for each extraction region R1-R6 can be effected during Feature Extraction FE. Specifically, as shown one can sum the RGB color channel value (e.g., $R_{ij}$) for each pixel in each extraction region of m×n pixels, and divide by the number of pixels m×n to arrive at an average for each RGB primary, e.g., $R_{avg}$ for red, as shown. Thus repeating this summation for each RGB color channel, the average for each extraction region would be a triplet $R_{AVG}=|R_{avg}, G_{avg}, B_{avg}|$. The same procedure is repeated for all extraction regions R1-R6 and for each RGB color channel. The number and size of extractive regions can depart from that shown, and be as desired.

The next step of performing color mapping transformations by RUR Mapping Transformation Circuit 10 can be illustratively shown and expressed using known tristimulus primary matrices, such as shown in FIG. 5, where a rendered tristimulus color space with vectors R, G, and B is transformed using the tristimulus primary matrix M with elements such as $X_{r,max}, Y_{r,max}, Z_{r,max}$ where $X_{r,max}$ is tristimulus value of the R primary at maximum output.

The transformation from a rendered color space to unrendered, device-independent space can be image and/or device specific—known linearization, pixel reconstruction (if necessary), and white point selection steps can be effected, followed by a matrix conversion. In this case, we simply elect to adopt the rendered video output space as a starting point for transformation to an unrendered color space colorimetry. Unrendered images need to go through additional transforms to make them viewable or printable, and the RUR transformation involves a transform to a second rendered color space.

As a first possible step, FIGS. 6 and 7 show matrix equations for mapping the video rendered color space, expressed by primaries R, G, and B and ambient lighting rendered color space, expressed by primaries R', G', and B' respectively, into unrendered color space X, Y, and Z as shown, where tristimulus primary matrix $M_1$ transforms video RGB into unrendered XYZ, and tristimulus primary matrix $M_2$ transforms ambient light source R'G'B' into unrendered XYZ color space as shown. Equating both rendered color spaces RGB and R'G'B' as shown in FIG. 8 allows matrix transformations of primaries RGB and R'G'B' of the rendered (video) color space and second rendered (ambient) color space to said unrendered color space (the RUR Mapping Transformation) using the first and second tristimulus primary matrices ($M_1$, $M_2$); and deriving a transformation of color information into the second rendered color space (R'G'B') by matrix multiplication of the RGB primaries of the rendered video color space, the first tristimulus matrix $M_1$, and the inverse of the second tristimulus matrix $(M_2)^{-1}$. While the tristimulus primary matrix for known display devices is readily available, that for the ambient light source can be determined using a known white point method by those of ordinary skill in the art.

Now referring to FIGS. 9-11, prior art derivation of a generalized tristimulus primary matrix M using a white point method is shown. In FIG. 9, quantities like $S_rX_r$ represents the tristimulus value of each (ambient light source) primary at maximum output, with $S_r$ representing a white point amplitude, and $X_r$ representing the chromaticities of primary light produced by the (ambient) light source. Using the white point method, the matrix equation equating $S_r$ with a vector of the white point reference values using a known inverse of a light source chromaticity matrix as shown. FIG. 11 is an algebraic manipulation to remind that the white point reference values such as $X_w$ are a product of the white point amplitudes or luminances and the light source chromaticities. Throughout, the tristimulus value X is set equal to chromaticity x; tristimulus value Y is set equal to chromaticity y; and tristimulus value Z is defined to be set equal to 1−(x+y). As is known, the color primaries and reference white color components for the second rendered ambient light source color space can be acquired using known techniques, such as by using a color spectrometer.

Similar quantities for the first rendered video color space can be found. For example, it is known that contemporary studio monitors have slightly different standards in North America, Europe, and Japan. However, international agreement has been obtained on primaries for high-definition television (HDTV), and these primaries are closely representative of contemporary monitors in studio video, computing, and computer graphics. The standard is formally denoted ITU-R Recommendation BT.709, which contains the required parameters, where the relevant tristimulus primary matrix (M) for RGB is:

0.640 0.300 0.150 Matrix M for ITU-R BT.709
0.330 0.600 0.060
0.030 0.100 0.790 and the white point values are known as well.

Figure 12:
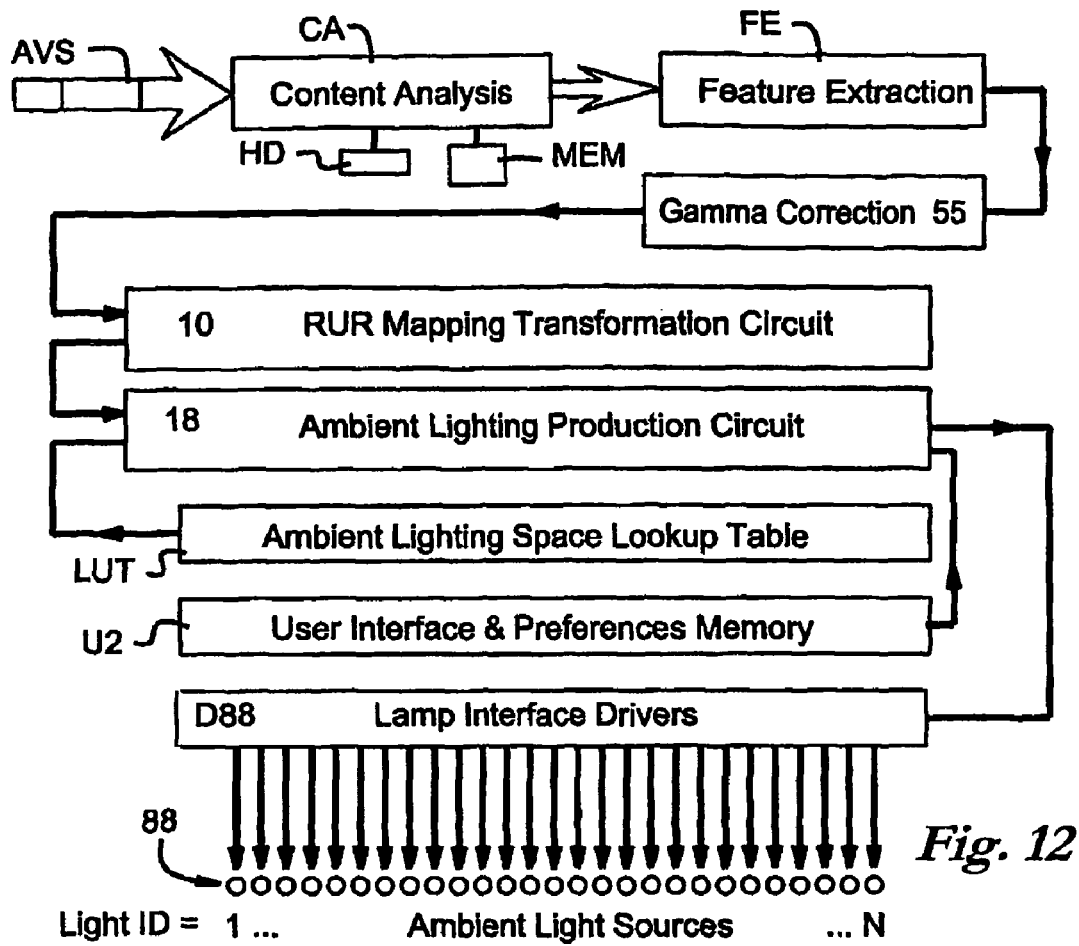
FIG. 12 shows a system similar to that shown in FIG. 3, additionally comprising a gamma correction step for ambient broadcast.

Now referring to FIG. 12, a system similar to that shown in FIG. 3 is shown, additionally comprising a gamma correction step 55 after feature extraction step FE as shown for ambient broadcast. Alternatively, gamma correction step 55 can be performed between the steps performed by RUR Mapping Transformation Circuit 10 and Ambient Lighting Production Circuit 18. Optimum gamma values for LED ambient light sources has been found to be 1.8, so a negative gamma correction to counteract a typical video color space gamma of 2.5 can be effected with the exact gamma value found using known mathematics.

Figure 13:
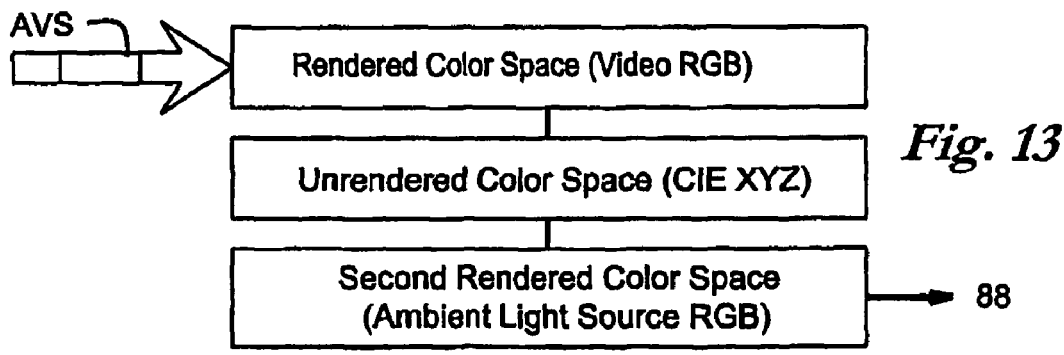
FIG. 13 shows a schematic for a general transformational process used in the invention.

Generally, RUR Mapping Transformation Circuit 10, which can be a functional block effected via any suitable known software platform, performs a general RUR transformation as shown in FIG. 13, where a schematic as shown takes video signal AVS comprising a Rendered Color Space such as Video RGB, and transforms it to an unrendered color space such as CIE XYZ; then to a Second Rendered Color Space (Ambient Light Source RGB). After this RUR transformation, ambient light sources 88 can be driven, aside from signal processing, as shown.

Figure 14:
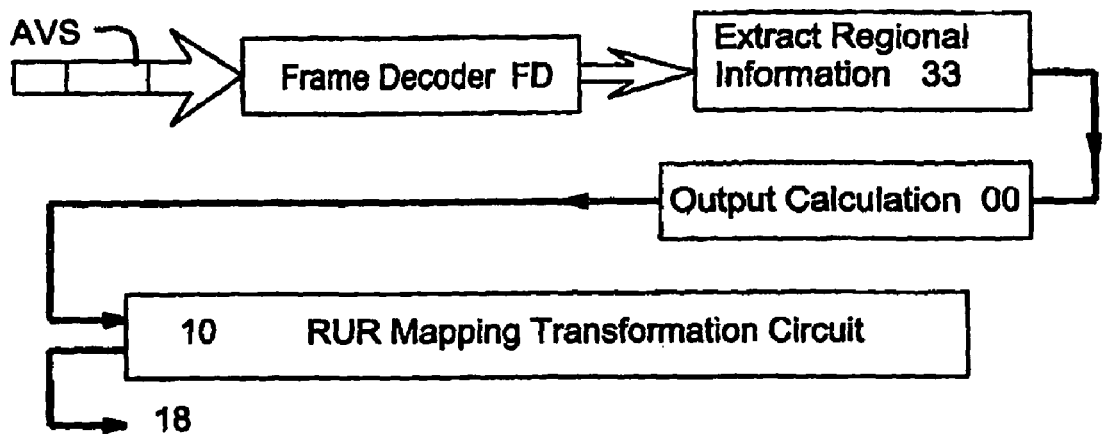
FIG. 14 shows an extraction step as shown in FIGS. 3 and 12, employing a frame decoder and performing an output calculation for driving an ambient light source.

FIG. 14 shows the top of FIGS. 3 and 12, where an alternative extraction step is shown whereby a frame decoder FD is used, Regional Information is extracted at step 33 as shown, and output calculations 00, such as the averaging of FIG. 4, is performed prior to data transfer to Ambient Lighting and Production Circuit 18 previously shown.

Figure 15:
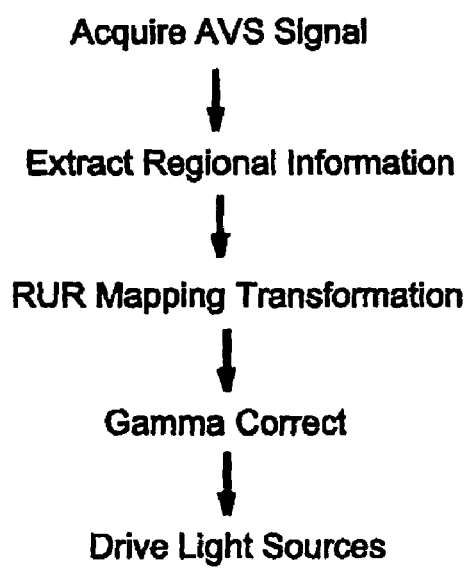
FIG. 15 shows process steps for color information extraction and processing for the invention.
Figure 16:
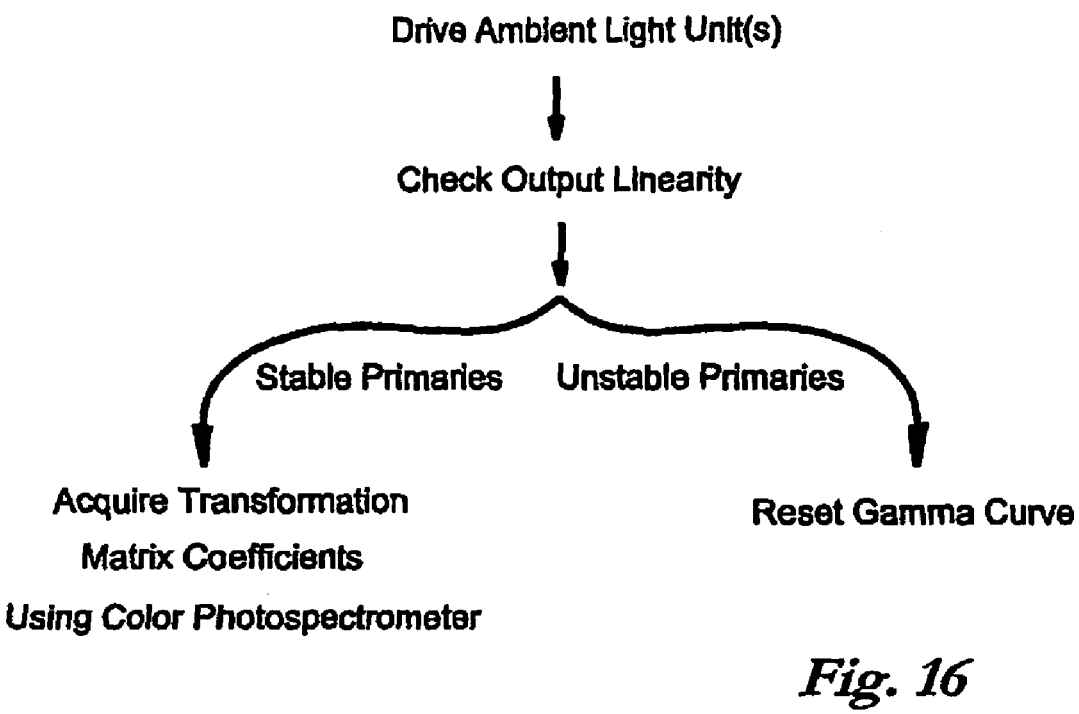
FIG. 16 shows process steps for acquiring transformation matrix coefficients for an ambient light source used by the invention.

As shown in FIG. 15, general process steps include Acquiring an video signal AVS; Extracting Regional (Color) Information; an RUR Mapping Transformation; optional Gamma Correction; and Driving Light Sources. Generally, FIG. 16 shows process steps for acquiring transformation matrix coefficients for an ambient light source used by the invention, where the steps include, as shown, Driving the ambient light unit(s); and Checking Output Linearity as known in the art. If the ambient light source primaries are stable, (shown on left fork, Stable Primaries), one can Acquire Transformation Matrix Coefficients Using a Color Spectrometer; whereas if the ambient light source primaries are not stable, (shown on right fork, Unstable Primaries), one can reset the previously given gamma correction (shown, Reset Gamma Curve).

Figure 17:
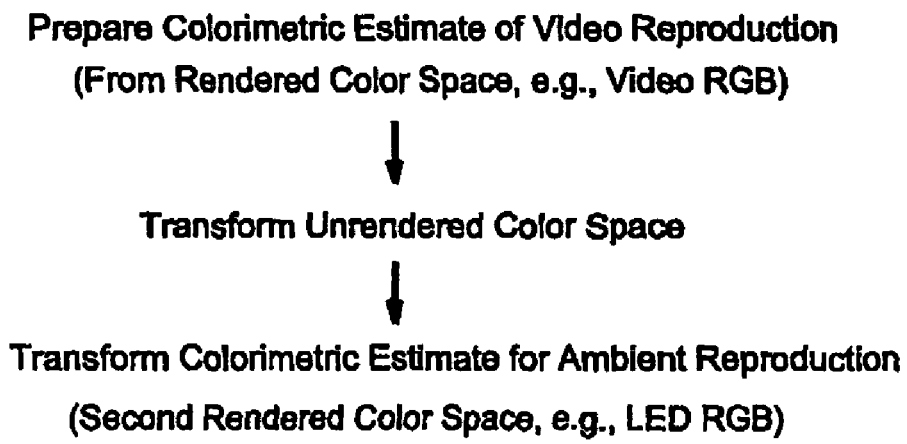
FIG. 17 shows process steps for estimated video extraction and ambient light reproduction using the invention.

In general, it is desirable, but not necessary to extract color information from every pixel in extraction regions such as R4, and instead polling of selected pixels can allow a faster estimation of average color, or a faster creation of a extraction region color characterization, to take place. FIG. 17 shows process steps for estimated video extraction and ambient light reproduction using the invention, where steps include [1] Prepare Colorimetric Estimate of Video Reproduction (From Rendered Color Space, e.g., Video RGB); [2] Transform to Unrendered Color Space; and [3] Transform Colorimetric Estimate for Ambient Reproduction (Second Rendered Color Space, e.g., LED RGB).

Generally, ambient light source 88 can embody various diffuser effects to produce light mixing, as well as translucence or other phenomena, such as by use of lamp structures having a frosted or glazed surface; ribbed glass or plastic; or apertured structures, such as by using metal structures surrounding an individual light source. To provide interesting effects, any number of known diffusing or scattering materials or phenomena can be used, including that obtain by exploiting scattering from small suspended particles; clouded plastics or resins, preparations using colloids, emulsions, or globules 1-5 :m or less, such as less than 1 :m, including long-life organic mixtures; gels; and sols, the production and fabrication of which is known by those skilled in the art. Scattering phenomena can be engineered to include Rayleigh scattering for visible wavelengths, such as for blue production for blue enhancement of ambient light. The colors produced can be defined regionally, such as an overall bluish tint in certain areas or regional tints, such as a blue light-producing top section (ambient light L1 or L2).

Ambient lamps can also be fitted with a goniophotometric element, such as a cylindrical prism or lens which can be formed within, integral to, or inserted within a lamp structure. This can allow special effects where the character of the light produced changes as a function of the position of the viewer. Other optical shapes and forms can be used, including rectangular, triangular or irregularly-shaped prisms or shapes, and they can be placed upon or integral to an ambient light unit or units. The result is that rather than yielding an isotropic output, the effect gained can be infinitely varied, e.g., bands of interesting light cast on surrounding walls, objects, and surfaces placed about an ambient light source, making a sort of light show in a darkened room as the scene elements, color, and intensity change on a video display unit. The effect can be a theatrical ambient lighting element which changes light character very sensitively as a function of viewer position—such as viewing bluish sparkles, then red light—when one is getting up from a chair or shifting viewing position when watching a home theatre. The number and type of goniophotometric elements that can be used is nearly unlimited, including pieces of plastic, glass, and the optical effects produced from scoring and mildly destructive fabrication techniques. Ambient lamps can be made to be unique, and even interchangeable, for different theatrical effects. And these effects can be modulatable, such as by changing the amount of light allowed to pass through a goniophotometric element, or by illuminating different portions (e.g., using sublamps or groups of LEDs) of an ambient light unit.

In this way, ambient light produced at L3 to emulate extraction region R3 as shown in FIG. 1 can have a chromaticity that provides a perceptual extension of a phenomenon in that region, such as the moving fish as shown. This can multiply the visual experience and provide hues which are appropriate and not garish or unduly mismatched.

Video signal AVS can of course be a digital datastream and contain synchronization bits and concatenation bits; parity bits; error codes; interleaving; special modulation; burst headers, and desired metadata such as a description of the ambient lighting effect (e.g., "lightning storm"; "sunrise"; etc.) and those skilled in the art will realize that functional steps given here are merely illustrative and do not include, for clarity, conventional steps or data.

The User Interface & Preferences Memory as shown in FIGS. 3 and 12 can be used to change preferences regarding the system behavior, such as changing the degree of color fidelity to the video content of video display D desired; changing flamboyance, including the extent to which any fluorescent colors or out-of-gamut colors are broadcast into ambient space, or how quickly or greatly responsive to changes in video content the ambient light is, such as by exaggerating the intensity or other quality of changes in the light script command content. This can include advanced content analysis which can make subdued tones for movies or content of certain character. Video content containing many dark scenes in content can influence behavior of the ambient light source 88, causing a dimming of broadcast ambient light, while flamboyant or bright tones can be used for certain other content, like lots of flesh tone or bright scenes (a sunny beach, a tiger on savannah, etc.).

The description is given here to enable those of ordinary skill in the art to practice the invention. Many configurations are possible using the instant teachings, and the configurations and arrangements given here are only illustrative. In practice, the methods taught and claimed might appear as part of a larger system, such as an entertainment center or home theatre center.

It is well known that for the functions and calculations illustratively taught here can be functionally reproduced or emulated using software or machine code, and those of ordinary skill in the art will be able to use these teachings regardless of the way that the encoding and decoding taught here is managed.

Those with ordinary skill in the art will, based on these teachings, be able to modify the apparatus and methods taught and claimed here and thus, for example, re-arrange steps or data structures to suit specific applications, and creating systems that may bear little resemblance to those chosen for illustrative purposes here.

The invention as disclosed using the above examples may be practiced using only some of the features mentioned above. Also, nothing as taught and claimed here shall preclude addition of other structures or functional elements.

Obviously, many modifications and variations of the present invention are possible in light of the above teaching. It is therefore to be understood that, within the scope of the appended claims, the invention may be practiced otherwise than as specifically described or suggested here.

The invention claimed is:

1. A method for extracting and processing video content encoded in a rendered color space (RGB) to be emulated by an ambient light source, comprising:
   (1) extracting color information from a video signal (AVS) that encodes at least some of said video content in said rendered color space;
   (2) transforming said color information to an unrendered color space (XYZ) via matrix transformations; and
   (3) transforming said color information from said unrendered color space to a second rendered color space (R'G'B') via matrix multiplication so as to allow driving said ambient light source to provide emulative ambient lighting drawn from said video content.

2. The method of claim 1, wherein step (1) additionally comprises decoding said video signal into a set of frames.

3. The method of claim 1, wherein step (1) additionally comprises extracting an average color ($R_{AVG}$) from said color information.

4. The method of claim 1, wherein step (1) additionally comprises at least one extraction of said color information from an extraction region (R1).

5. The method of claim 4, wherein step (1) additionally comprises using said extraction of said color information transformed in the second rendered color space to broadcast ambient light (L4) from said ambient light source adjacent said extraction region.

6. The method of claim 5, wherein step (1) additionally comprises extracting an average color ($R_{AVG}$) from said color information.

7. The method of claim 1, additionally comprising performing a gamma correction to said second rendered color space.

8. A method for extracting and processing video content encoded in a rendered color space (RGB) to be emulated by an ambient light source, comprising:
   (1) extracting color information from a video signal (AVS) that encodes at least some of said video content in said rendered color space;
   (2) transforming said color information to an unrendered color space (XYZ); and
   (3) transforming said color information from said unrendered color space to a second rendered color space (R'G'B') so formed as to allow driving said ambient light source, wherein steps (2) and (3) additionally comprise matrix transformations of primaries (RGB, R'G'B') of said rendered color space and second rendered color space to said unrendered color space using first and second tristimulus primary matrices ($M_1$, $M_2$); and deriving a transformation of said color information into said second rendered color space (R'G'B') by matrix multiplication of said primaries of said rendered color space, said first tristimulus matrix, and the inverse of said second tristimulus matrix $(M_2)^{-1}$.

9. The method of claim 8, wherein said unrendered color space is one of CIE XYZ; ISO RGB defined in ISO Standard 17321; Photo YCC; and CIE LAB.

10. The method of claim 8, wherein step (1) additionally comprises extracting an average color ($R_{AVG}$) from said color information.

11. The method of claim 10, wherein step (1) additionally comprises at least one extraction of said color information from an extraction region (R1).

12. The method of claim 11, wherein step (1) additionally comprises using said extraction of said color information transformed in the second rendered color space to broadcast ambient light (L4) from said ambient light source adjacent said extraction region.

13. The method of claim 1, wherein steps (1), (2), and (3) are substantially synchronous with said video signal (AVS).

14. The method of claim 1, additionally comprising broadcasting ambient light (L1) from said ambient light source using said color information in said second rendered color space.

15. A method for extracting and processing border region video content from a rendered color space (RGB) to be emulated by an ambient light source, comprising:
   (1) extracting color information from a video signal (AVS) that encodes at least some of said video content in said rendered color space, after decoding said video signal into individual frames;
   (2) extracting an average color ($R_{AVG}$) from said color information from an extraction region (R1) in each of said individual frames;
   (3) transforming said average color to an unrendered color space (XYZ) via matrix transformations;
   (4) transforming said average color from said unrendered color space to a second rendered color space (R'G'B') via matrix multiplication so as to allow driving said ambient light source; and
   (5) using said average color transformed in said second rendered color space to broadcast ambient light (L4) from said ambient light source adjacent said extraction region to provide emulative ambient lighting drawn from said border region video content.

16. The method of claim 15, wherein steps (1), (2), (3), (4), and (5) are substantially synchronous with said video signal (AVS).

17. The method of claim 15, wherein steps (3) and (4) additionally comprise matrix transformations of primaries (RGB, R'G'B') of said rendered color space and second rendered color space to said unrendered color space using first and second tristimulus primary matrices ($M_1$, $M_2$); and deriving a transformation of said color information into said second rendered color space (R'G'B') by matrix multiplication of said primaries of said rendered color space, said first tristimulus matrix, and the inverse of said second tristimulus matrix $(M_2)^{-1}$.

18. A method for extracting and processing border region video content from a rendered color space (RGB) to be emulated by an ambient light source, using a colorimetric estimate, comprising:
  (1) extracting color information from a video signal (AVS) that encodes at least some of said video content in said rendered color space, after decoding said video signal into individual frames;
  (2) extracting a colorimetric estimate from said color information from an extraction region (R1) in each of said individual frames;
  (3) transforming said colorimetric estimate to an unrendered color space (XYZ) via matrix transformations;
  (4) transforming said colorimetric estimate from said unrendered color space to a second rendered color space (R'G'B') via matrix multiplication so as to allow driving said ambient light source; and
  (5) using said colorimetric estimate transformed in said second rendered color space to broadcast ambient light (L4) from said ambient light source adjacent said extraction region to provide emulative ambient lighting drawn from said border region video content.

19. The method of claim 18, wherein steps (1), (2), (3), (4), and (5) are substantially synchronous with said video signal (AVS).

20. The method of claim 18, wherein steps (3) and (4) additionally comprise matrix transformations of primaries (RGB, R'G'B') of said rendered color space and second rendered color space to said unrendered color space using first and second tristimulus primary matrices ($M_1$, $M_2$); and deriving a transformation of said color information into said second rendered color space (R'G'B') by matrix multiplication of said primaries of said rendered color space, said first tristimulus matrix, and the inverse of said second tristimulus matrix $(M_2)^{-1}$.

* * * * *